US011953187B2

(12) United States Patent
Budavari et al.

(10) Patent No.: US 11,953,187 B2
(45) Date of Patent: Apr. 9, 2024

(54) LUMINAIRE HEAD WITH AN INTERCONNECTING INTERFACE

(71) Applicant: Schreder S.A., Brussels (BE)

(72) Inventors: Peter Budavari, Nyergesújfalu (HU); Csaba Horvath, Budapest (HU); Peter Balázs Bedo, Budapest (HU); Attila Sápi, Budapest (HU)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/760,496

(22) PCT Filed: Feb. 12, 2021

(86) PCT No.: PCT/EP2021/053543
§ 371 (c)(1),
(2) Date: Aug. 10, 2022

(87) PCT Pub. No.: WO2021/160853
PCT Pub. Date: Aug. 19, 2021

(65) Prior Publication Data
US 2023/0125172 A1 Apr. 27, 2023

(30) Foreign Application Priority Data
Feb. 12, 2020 (NL) ..................................... 2024888

(51) Int. Cl.
*F21V 21/35* (2006.01)
*F21V 23/06* (2006.01)
(Continued)

(52) U.S. Cl.
CPC .............. *F21V 21/35* (2013.01); *F21V 23/06* (2013.01); *H01R 13/741* (2013.01);
(Continued)

(58) Field of Classification Search
CPC ...... F21V 21/35; F21V 23/06; F21Y 2115/10; F21Y 2105/10; H01R 13/741; H01R 33/945
See application file for complete search history.

(56) References Cited

U.S. PATENT DOCUMENTS 6,979,097 B2 * 12/2005 Elam ..................... F21V 23/026 362/648
10,323,806 B1 * 6/2019 Li ........................... F21V 15/01
(Continued)

FOREIGN PATENT DOCUMENTS

KR 102044663 * 12/2019 .............. F21V 21/35
NL 2022430 B1 8/2018
(Continued)

OTHER PUBLICATIONS

KR 102044663, Dec. 2, 2019, Jun Hoe Kang, English Translation (Year: 2019).*
(Continued)

*Primary Examiner* — Peggy A Neils
(74) *Attorney, Agent, or Firm* — McDonnell Boehnen Hulbert & Berghoff LLP

(57) ABSTRACT

Example embodiments relate to luminaire heads with interconnecting interfaces. One example luminaire head including an interconnected interface for an electronic device includes a support layer and a cover layer arranged over the support layer. The support layer includes a plurality of electrical tracks arranged on a surface of the support layer and connectable to a power supply of the luminaire head. The support layer also includes a first electrical connector. The first electrical connector is connected to at least one of the plurality of electrical tracks and is suited for connecting to the electronic device. Further, the support layer includes a second electrical connector. The second electrical connector is directly connected to the first electrical connector via
(Continued)

the at least one of the plurality of electrical tracks. An upper surface of the cover layer includes a first opening and at least one retaining means.

20 Claims, 7 Drawing Sheets

(51) Int. Cl.
*F21Y 105/10* (2016.01)
*F21Y 115/10* (2016.01)
*H01R 13/74* (2006.01)
*H01R 33/945* (2006.01)

(52) U.S. Cl.
CPC ........ *H01R 33/945* (2013.01); *F21Y 2105/10* (2016.08); *F21Y 2115/10* (2016.08)

(56) References Cited

U.S. PATENT DOCUMENTS

| | | | | |
|---|---|---|---|---|
| 10,539,308 | B2 * | 1/2020 | Bernard .................. | F21V 21/35 |
| 2015/0216017 | A1 | 7/2015 | Pratt et al. | |

FOREIGN PATENT DOCUMENTS

| | | | |
|---|---|---|---|
| WO | 2016166065 | A1 | 10/2016 |
| WO | 2019015976 | A1 | 1/2019 |
| WO | 2020152227 | A1 | 7/2020 |

OTHER PUBLICATIONS

PCT International Search Report and Written Opinion, Application No. PCT/EP2021/053543, dated Apr. 30, 2021, 12 pages.

* cited by examiner

LUMINAIRE HEAD WITH AN INTERCONNECTING INTERFACE

CROSS-REFERENCE TO RELATED APPLICATIONS

The present application is a national stage entry of PCT/EP2021/053543 filed Feb. 12, 2021, which claims priority to NL 2024888 filed Feb. 12, 2020, the contents of each of which are hereby incorporated by reference.

FIELD OF INVENTION

The field of the invention is related to a luminaire head comprising an interconnecting interface, and in particular an interconnecting interface comprising electrical tracks.

BACKGROUND

NL2022430 in the name of the applicant discloses a connection module for a luminaire with a light module, comprising a support, surge protection circuitry arranged on the support, a first and second supply terminal for connection to a power supply, said first and second supply terminal being connected to the surge protection circuitry, a first and second load terminal for connection to a drive means of the light module, said first and second load terminal being connected to the surge protection circuitry, and at least a first and second control terminal. A connection line for electrically connecting the first and second control terminal is arranged on the support. NL2022430 is included herein by reference.

Generally, luminaire heads assembly involves the gathering of multiple components such as electrical devices, cables and fixation means, in order to realize the desired electrical circuitry with the right functions. These numerous components can be placed in a compartment of the luminaire head, for example, and assembled together. Since typically, the volume within or around a luminaire head is limited, disposition of the different components is optimized and the assembly has generally to be done by following assembling steps in a particular order for every component to end up in place. However, when performing the first assembly or during maintenance, handling of cables and connections can be cumbersome due to the limited free space available and the inconveniency of managing a clear layout in the midst of a complex electrical circuit. This can cause in turn inaccuracies in the electrical connections and the mechanical fixations of the different components comprised in a luminaire head. Indeed, depending on the amount of components to be electrically connected inside the luminaire head for example, such as SPDs, control modules, LED drivers, power supply wires, fuses, varistors, and the like, a large number of wire harnesses to be created and maintained may be required, which may be long and cumbersome on the assembly lines at the manufacturing stage or during maintenance, and may increase the risk of causing wiring mistakes between the different components inside the luminaire head. Therefore, a luminaire head comprising an interconnecting interface is needed to facilitate the assembly and interconnection of some components which are part of the luminaire head.

It is known to provide a luminaire head with a gear compartment into which the multiple components composing the electrical circuitry of the luminaire head are placed. However, even well organized, the components are often placed over several "layers" and cable connections are rendered complex, both in their layout and in their handling, increasing the probability of mishaps. Hence, there is a need for a luminaire head capable of decreasing the complexity and clutter of its electrical circuitry in order to prevent mistakes and facilitate maintenance.

SUMMARY

The object of embodiments of the invention is to provide a luminaire head with an interconnecting interface capable of decreasing the difficulty in interconnecting some of the multiple components which are part of the electrical circuitry of the luminaire head, as well as decreasing the amount of clutter generated by it.

According to a first aspect of the invention there is provided a luminaire head comprising an interconnecting interface for an electronic device. The interconnecting interface comprises a support layer and a cover layer. The support layer comprises: a plurality of electrical tracks arranged on its surface and connectable to a power supply of the luminaire head; a first electrical connector, said first electrical connector being connected to at least one of the plurality of electrical tracks and being suited for connecting to the electronic device; and a second electrical connector, said second electrical connector being directly connected to the first electrical connector via the at least one of the plurality of electrical tracks. The cover layer is arranged over the support layer. An upper surface of the cover layer comprises a first opening forming passage for the first electrical connector, and comprises at least one retaining means configured for retaining in a removable manner the electronic device in electrical contact with the first electrical connector through the first opening. More in particular, the at least one retaining means may be configured for maintaining a plug or a connector of the electronic device in electrical contact with the first electrical connector. Embodiments of the invention are based inter alia on the inventive insight that an electronic device being part of the luminaire head has its operating ability influenced by its mounting fixation strength and the stability of its electrical connections. The inventors have discovered that, when assembling an electronic device as part of the luminaire head, the interconnections between the electronic device and other components composing the electrical circuitry of the luminaire head were prone to vulnerability due to the many cumulative elements involved in the interconnections, e.g. connectors, wires. Due to space constraints, wires may be bended and space for manipulation cluttered, which may result in less-than-ideal interconnecting conditions.

By providing an interconnecting interface with properly laid out electrical tracks combined with electrical connectors, the number of elements in electrical interconnections to and/or from the electronic device can be reduced and they can be supplied directly with power from the power supply of the luminaire head. Additionally, using electrical tracks instead of wires produces a predictable usage of space having a fixed volume which decreases the clutter. The retaining means improves further the usability of the interconnecting interface by having the dual use of mechanical retention and insuring electrical connectivity, while providing ease of maintenance from its removable nature.

In a preferred embodiment, the electronic device is mounted on the cover layer or on the support layer.

In a typical embodiment, the retaining means may be any one of a friction means, a snap-fit means, a screwing means, a clipping means, a magnetic retaining means, and/or an adhesive. The support layer may be made in an electrically insulating material. The skilled person will understand that the electrical tracks may be arranged on the support layer via various techniques, e.g. injection, deposition, adhesion. It is to be noted that the electronic device may be suited for cooperating with the retaining means or may be provided with a casing or additional parts, such as a mounting frame, a plugging element, an attaching element, suitable for cooperating with the retaining means. The first and second electrical connector may be female or male connectors, e.g. one or more protruding pins. The first and second electrical connector may be similar or may be different. For example, the first electrical connector may protrude outwardly from a surface of the support layer, and the second electrical connector may be configured for connecting on an opposite surface thereof. The cover layer and the support layer may be made of similar or different materials. The cover layer may be fixed to the support layer or may be fixed directly to the luminaire head. The cover layer may be provided with at least one indent configured for cooperating with the footprint of the electronic device. In order to protect the support layer adequately, the cover layer may cover at least 80%, preferably at least 90%, of the footprint of the support layer.

In a preferred embodiment, the luminaire head comprises a luminaire head housing, and the support layer is arranged on the luminaire head housing.

In this manner, the support layer is arranged in a predetermined location and may not require a specifically designed additional compartment. Depending on the shape of the luminaire head housing, the support layer may be adjusted to be suited to fit the housing dimensions and/or curvature. The support layer may be placed within the luminaire head housing to be better protected from the outside environment, or may be placed on an external surface of the luminaire head housing, optionally within a protective casing. In a typical embodiment, the luminaire head housing may be made of metal and the support layer may be in thermal contact with the luminaire head housing such that the luminaire head housing acts as a heat sink.

In an exemplary embodiment, the support layer and a portion of the luminaire head housing are molded in one piece. The portion of the luminaire head housing incorporating the support layer may be a cover portion of the luminaire head housing, said cover portion including a transparent or translucent material, or may be a main body portion of the luminaire head housing.

In this way, the luminaire head housing has a dual usage. It may allow employing fewer elements to interconnect the electronic device, which saves space and allows optimizing the volume available. The portion of the luminaire head with which the support layer is molded may be in an electrically insulating material. The rest of the luminaire head housing may be made of the same material or a different one.

In a favored embodiment, the support layer and/or the cover layer is at least 10 cm×10 cm, e.g. at least 15 cm×15 cm, or even at least 15 cm×30 cm.

In that manner, one or more components e.g. the electronic device may be supported on the cover layer and/or the support layer.

Preferably, the support layer and/or the cover layer structurally supports one or more of components e.g. the electronic device and/or a light module of the luminaire head. For example, the cover layer may support a LED array and/or a driver; or the cover layer may support the driver and the support layer may carry the LED array.

Additionally, the luminaire head may comprise another cover layer opposite the cover layer with respect to the support layer. The interconnecting interface may be further configured for being connected to another electronic device, e.g. a LED array, on an opposite side of the support layer with respect to the electronic device, e.g. a driver.

In a possible embodiment the electrical tracks may be tracks similar to tracks used on a PCB, in which case the tracks may be relatively thin, e.g. below 100 microns. However, in other embodiment the tracks may be punched or cut out of a metal sheet. In such an embodiment the tracks may be relatively thick. For example, the electrical tracks may have a thickness between 0.25 mm and 1 mm, more preferably between 0.35 mm and 0.70 mm Such tracks provide additional rigidity and are suitable for large currents.

In a preferred embodiment, the portion of the luminaire head housing is an external wall of the luminaire head housing.

In this manner, the interconnecting interface may be made more accessible and the internal layout of the luminaire head housing, for example, may be simplified.

In an exemplary embodiment, the at least one retaining means and the cover layer are molded in one piece.

In this way, the at least one retaining means is located in a predetermined place. Since the at least one retaining means is integrated to the cover layer, the number of elements required for the assembly of the luminaire head components may be decreased. The cover layer and the at least one retaining means may be formed, e.g. by injection molding, casting, transfer molding or in another appropriate manner Preferably, the at least one retaining means is located next to the opening in the cover layer to be adapted to electronic devices having reduced footprints. The at least one retaining means may be a mechanical retaining means, a magnetic retaining means, and/or an adhesive.

In a preferred embodiment, the at least one retaining means is a mechanical retaining means, preferably a snap-fit retaining means.

In this manner, the design of the at least one retaining means may be simplified, and the retaining function may be more reliable. The retaining means may be any one of a friction means, a snap-fit means, a screwing means, a clipping means. The mechanical retaining means may be assisted or completed by additional retaining means, mechanical or non-mechanical. In one embodiment, the opening in the cover layer may be surrounded by a wall forming a plug and the electronic device may be provided with a complementary plug and retained by friction when plugged.

In a typical embodiment, the at least one retaining means may be a snap-fit retaining means made of an elastic material, e.g. plastic, and comprise at least one snap-fit member extending outwardly with respect to the cover layer. In another embodiment, the at least one retaining means may comprise at least one or more pairs of members located on opposite sides of the opening to securely retain the electronic device. Additionally or alternatively, the electronic device may be enclosed in a casing with snap-fit retaining means and provided to the cover layer, said snap-fit retaining means being adapted for cooperating with corresponding recesses of the cover layer.

In an exemplary embodiment, the cover layer may be provided with one or more structural elements which are molded in one piece with the cover layer. Such structural elements may have a mechanical function or a marking function or an identifying function. For example, a structural element may have a retaining or guiding or positioning function, or may indicate where a component should be located or connected on the cover layer, or may be provided with a identification means, etc.

In an exemplary embodiment, a cable organizer, such as a clip may be provided to the cover layer. The cable organizer may be mounted to the cover layer or may be integral to the cover layer. In a preferred embodiment, the cable organizer may be molded in one piece with the cover layer. The cable organizer may be configured for retaining and/or guiding and/or positioning one or more cables or wires extending e.g. to and from the electronic device, such that said one or more cables or wires are better organized. For example, the cable organizer may be a simple bracket dimensioned and shaped such that one or more cables can be arranged below the bracket.

Additionally or alternatively, the cover layer may be provided with embossing or engravings for indicating information to a user of the luminaire head, such has caution messages, component indications, mounting information, etc. Also, the cover layer may be provided with recesses facilitating the placing of components on the cover layer.

In an exemplary embodiment, the electronic device is one of: a driver, e.g. a lighting driver, a sensing means, a processing means, a transmission means, a communication means, a metering device, an electrical protection means, e.g. an ESD protection device, a filtering unit, a surge protection device, a fuse, a varistor, a control module, a light module, an indicator means, such as a LED indicator, or other active or passive electronic components/parts.

In this way, at least one of the essential components of a luminaire head may have dedicated interconnections.

In a preferred embodiment, the interconnecting interface comprises the electronic device provided to it.

In an exemplary embodiment, the electronic device is embedded in a packaging.

In this manner, the electronic device may be protected from the surrounding environment. The packaging may be designed for being adapted to the at least one retaining means and/or to cooperate with the first electrical connector. The packaging may be one integrally molded element.

In a preferred embodiment, the cover layer is in contact with the plurality of electrical tracks.

In this way, the overall volume of the interconnecting interface can be reduced and the plurality of electrical tracks may be better protected from the surrounding environment. The cover layer may be a rigid cover layer or may be a flexible cover layer. The cover layer may be fabricated separately and then arranged over the support layer, or may be applied directly to the support layer. The cover layer may be made of a polymeric material, e.g. polymeric resin.

Alternatively, the cover layer is at a distance of less than 5 mm, preferably less than 3 mm, more preferably less than 1 mm from the plurality of electrical tracks. Doing so may provide for some margin space not to impede thermal expansion of different materials while still obtaining a compact assembly of the support layer and the cover layer.

In an exemplary embodiment, the upper surface of the cover layer comprises a guiding means surrounding the first opening and configured for guiding the connection of the electronic device with the first electrical connector through the first opening.

In this manner, the electrical connection may be more secure and reproducible, and allows for an easy assembly. Additionally, the guiding means may improve the positioning accuracy of the electronic device. In an embodiment, the guiding means may be a wall surrounding the opening in the cover layer and form a plug. The guiding means and the at least one retaining means may be formed integrally to decrease the number of separate elements and optimize the functions of the interconnecting interface.

In a preferred embodiment, the guiding means is configured for engaging the packaging of the electronic device.

In this way, the guiding means and the packaging of the electronic device may be designed in a limited number of variants, and optimized for automatized assembly procedures.

In an exemplary embodiment, the plurality of electrical tracks is submerged in one piece consisting of the cover layer and the support layer.

In this manner, the interconnecting interface is provided with supplementary integral parts which improve the solidity, the simplicity, and the reliability of the interconnecting interface.

In a preferred embodiment, the upper surface of the cover layer comprises a second opening forming passage for the second electrical connector.

In this way, multiple components may be connected to the upper surface of the interconnecting interface, further optimizing its usability as a space saver.

In an exemplary embodiment, the electronic device, when connected to the at least one electrical connector, is removable, preferably in a tool-less manner, from within the luminaire head housing.

In this manner, maintenance is facilitated when replacing the electronic device for example.

In a preferred embodiment, the luminaire head comprises a light module electrically connected to the interconnecting interface.

In a typical embodiment, the light module comprises a plurality of light sources, e.g. LEDs e.g. organized in an array, disposed on a substrate, e.g. a PCB, and the substrate may be supported and/or maintained on the cover layer and/or the support layer. Alternatively, the light sources may be arranged directly on the cover layer and/or the support layer. For example, the LEDs may be arranged in a planar array and the plurality of electrical tracks may extend in a plane substantially parallel to said planar array. Additionally or alternatively, the electronic device may be a driver enclosed in a housing and the housing may be supported and/or maintained on the cover layer.

In this way, the main function of a luminaire, lighting, may be connected to the interconnecting interface. The interconnecting interface may thus provide an interconnecting hub for the luminaire head. The main functions of the luminaire head may be reliably assembled and the layout of the assembly optimized. Additionally, the layout of the interconnecting interface may be optimized for automatized assembly procedures.

In an exemplary embodiment, the second electrical connector is suited for connecting to another electronic device.

In this manner, more components may be provided to the interconnecting interface and the volume and clutter of the luminaire head may be further decreased. The another electronic device may be one of: a driver, e.g. a lighting driver, a sensing means, a processing means, a transmission means, a communication means, a metering device, an electrical protection means, e.g. an ESD protection device, a filtering unit, a surge protection device, a fuse, a varistor, a control module, or other active or passive electronic components/parts.

In a preferred embodiment, the support layer further comprises a third electrical connector, said third electrical connector being connected to at least one of the plurality of electrical tracks, preferably further comprises a fourth electrical connector, said fourth electrical connector being connected to at least one of the plurality of electrical tracks, and more preferably further comprises a fifth electrical connector, said fifth electrical connector being connected to at least one of the plurality of electrical tracks.

In a typical embodiment, the first electrical connector is connected to a driver, and, optionally, the second electrical connector is connected to a light module, the third electrical connector is connected to a sensing means, the fourth electrical connector is connected to a surge protection device, and the fifth electrical connector is connected to a controller socket, e.g. NEMA socket, Zhaga socket, low voltage socket. The skilled person will understand that the terms “first”, “second”, “third”, “fourth”, and “fifth” are merely indicative and do not restrict the connection of each of the components to a specific electrical connector.

In this way, the usage of the interconnecting interface may be further optimized, improving the integration of the different components of the luminaire head.

According to another aspect of the invention there is provided a luminaire system including: a power supply, and a luminaire head comprising an interconnecting interface for an electronic device. The luminaire head of the luminaire system may be the luminaire head of any of the hereinabove described luminaire head embodiments. The power supply is connected to a plurality of electrical tracks arranged on a surface of the support layer included in the interconnecting interface of the luminaire head. The skilled person will understand that the hereinabove described technical considerations and advantages for luminaire head embodiments also apply to the above mentioned corresponding luminaire system embodiments, mutatis mutandis.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF THE FIGURES

Figure 1A:
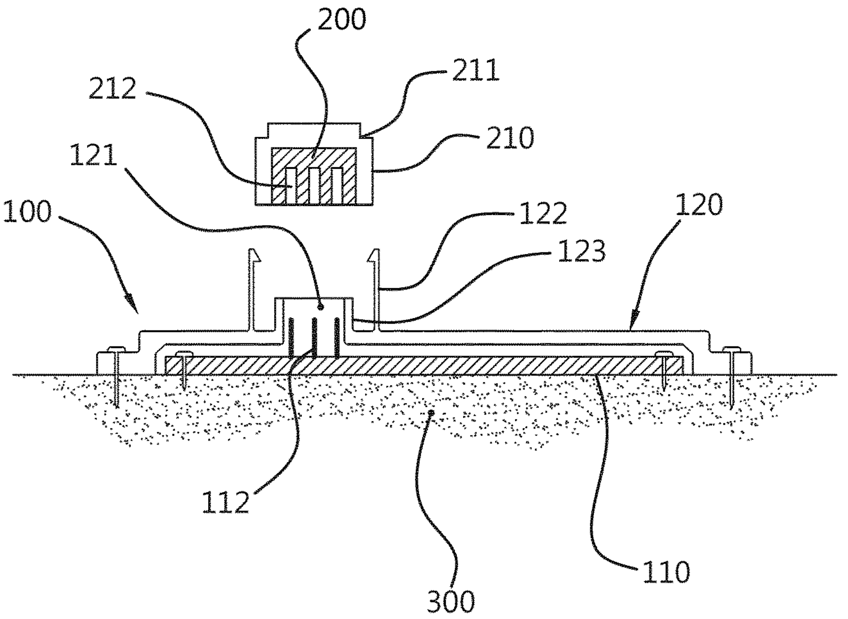
FIGS. 1A and 1B schematically illustrate a cut side-view and an exploded perspective view, respectively, of an interconnecting interface and a portion of a luminaire head according to an exemplary embodiment of the invention.
Figure 1B:
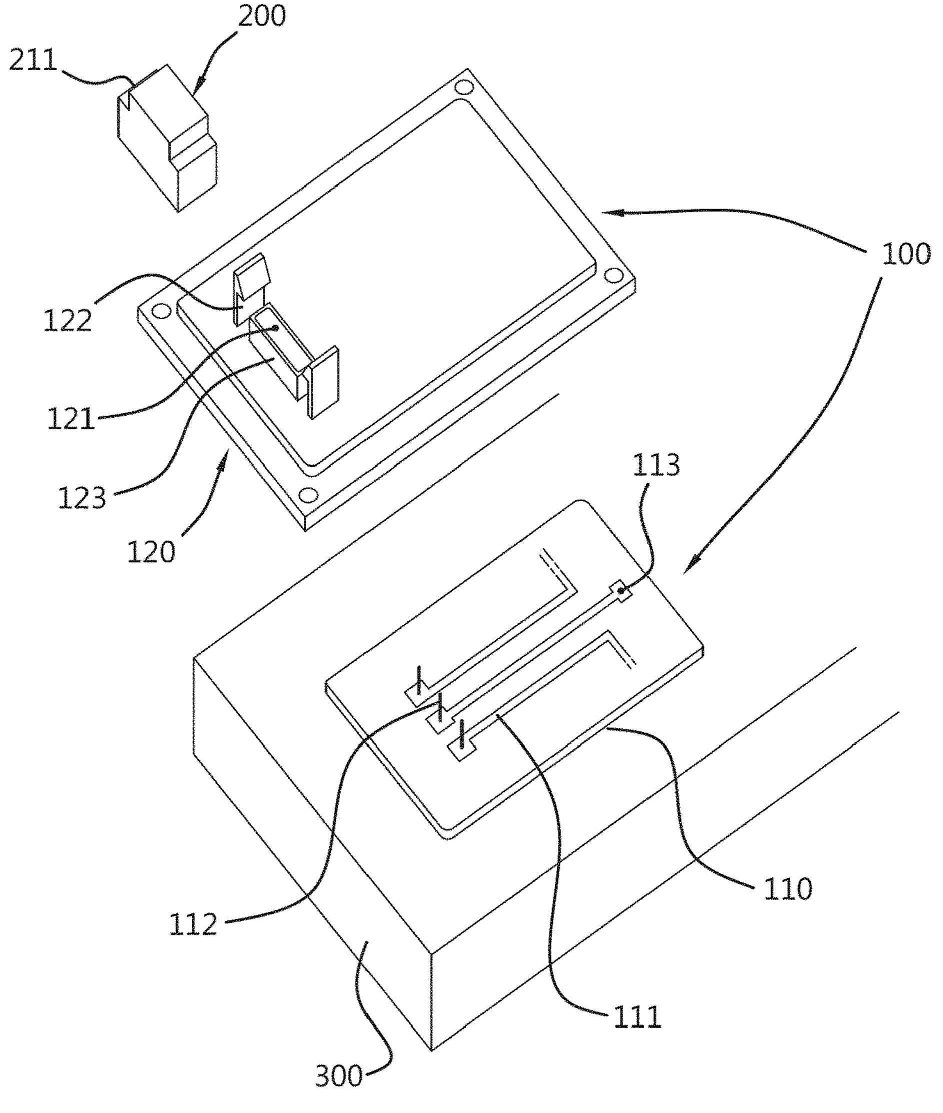

FIGS. 1A and 1B schematically illustrate a cut side-view and an exploded perspective view, respectively, of an interconnecting interface and a portion of a luminaire head according to an exemplary embodiment of the present invention. The luminaire head comprises an interconnecting interface 100 for an electronic device 200. The interconnecting interface 100 comprises a support layer 110 and a cover layer 120 arranged over the support layer 110.

The support layer 110 comprises a plurality of electrical tracks 111 arranged on a surface of the support layer 110. The plurality of electrical tracks 111 may be made out of an electrically conducting material, e.g. metal. The plurality of electrical tracks 111 may be provided via chemical etching, evaporation, deposition, injection, molding, gluing or other appropriate methods. In some embodiments, the tracks may be arranged in a similar way as on a PCB. However, in other embodiments, the tracks may be cut out of, e.g. punched of a metal sheet and have a thickness between 0.25 mm and 1 mm, e g between 0.35 mm and 0.70 mm. The plurality of electrical tracks 111 are connectable to a power supply (not shown) of the luminaire head, e.g. battery, mains. The skilled person will understand that the plurality of electrical tracks 111 and the power supply may be electrically connected via any known means, e.g. soldering to electrical pads, via a dedicated electronic connector, etc.

The support layer 110 below the plurality of electrical tracks 111 may be made out of an electrically insulating material. In an embodiment, the support plate 110 and the plurality of electrical tracks 111 may form a printed circuit board assembly, PCBA.

The support layer 110 may be arranged on a surface portion of the luminaire head. This surface portion of the luminaire head may be located within a luminaire head housing 300 or outside of the luminaire head housing 300. The support layer 110 may be fixed to the luminaire head housing 300 via various fixation means. Depending on the surface portion of the luminaire head onto which the support layer 110 is arranged, the shape of the support layer 110 may be adapted according to predetermined dimensions and curvature. The support layer 110 may be arranged in a specific compartment, such as a gear compartment, or may be arranged directly on a portion of an wall of the luminaire head housing 300, e.g. on a portion of an external wall of the luminaire head housing 300. Depending on the material of the surface portion of the luminaire head, the surface portion in thermal contact with the support layer 110 may act as a heat sink. The rest of the luminaire head may be made in the same material or in a different material as the surface portion of the luminaire head. In an embodiment, the surface portion of the luminaire head may be made of an electrically-conductive material, and there may be an electrical insulation layer between the support layer 110 and the surface portion of the luminaire head.

The support layer 110 comprises a first electrical connector 112 and a second electrical connector 113. The first electrical connector 112 is connected to at least one of the plurality of electrical tracks 111. The first electrical connector 112 may comprise one or more connecting elements, three connecting elements in the embodiment of FIGS. 1A-1B. The first electrical connector 112 may comprise male and/or female elements for electrically connecting with a first complementary electrical connector 212. In the embodiment of FIGS. 1A-1B, the first electrical connector 112 comprises three outwardly protruding pins. Each connecting element comprised in the first electrical connector 112 may be connected to the same or different electrical tracks. In another embodiment, the first electrical connector 112 may comprise a different number of connecting elements.

The first electrical connector 112 is suited for connecting to the electronic device 200. The electronic device 200 may comprise the first complementary electrical connector 212, or the first complementary electrical connector 212 may be provided separately to the electronic device 200. The electronic device 200 may be any one of: a driver, e.g. a lighting driver, a sensing means, a processing means, a transmission means, a communication means, a metering device, an electrical protection means, e.g. an ESD protection device, a filtering unit, a surge protection device, a fuse, a varistor, a control module, or other active or passive electronic components/parts. Optionally, the electronic device 200 may be embedded in a packaging 210, or provided with a casing such that it is better protected from the surrounding environment. The packaging 210 or casing may allow an easier connection of the first electrical connector 112 and the first complementary electrical connector 212.

At least one connecting element of the first electrical connector 112 is connected to the second electrical connector 113 via at least one of the plurality of electrical tracks 111. The second electrical connector 113 may comprise one or more connecting elements, one connecting element in the embodiment of FIGS. 1A-1B. The second electrical connector 113 may comprise male and/or female elements for electrically connecting with a second complementary electrical connector. The second electrical connector 113 may be configured to be connected to the same side or to an opposite side of the support layer 110 as the first electrical connector 112, to the same side in the embodiment of FIGS. 1A-1B.

The cover layer 120 is arranged over the support layer 110. In the embodiment of FIGS. 1A-1B, the cover layer 120 is fixed over the support layer directly to the luminaire head housing 300 and the internal surface of the cover layer 120 is at a distance of the support layer 110. Depending on embodiments, the cover layer 120 may be at a distance of less than 5 mm, preferably less than 3 mm, more preferably less than 1 mm from the plurality of electrical tracks 111. In another embodiment, the support layer 110 is fixed to the cover layer 120. The support layer 110 and the cover layer 120 may be made of similar or different materials. The support layer 110 and the cover layer 120 may be made in one piece for example. In still another embodiment, the cover layer 120 is made of a polymer, e.g. a polymeric resin, directly applied on the support layer 110 and the plurality of electrical tracks 111 is submerged below this cover layer. In yet another embodiment, the plurality of electrical tracks 111 may be submerged in one piece consisting of the cover layer 120 and the support layer 110, by multi-shot injection molding for example. In yet another embodiment, the cover layer 120 and the support layer 110 may be integrated in a portion of the external wall of the luminaire head housing 300 and the plurality of electrical tracks 111 may be submerged within it.

An upper surface of the cover layer 120 comprises a first opening 121 forming passage for the first electrical connector 112. The first opening 121 may comprise a through-hole surrounding the one or more connecting elements of the first electrical connector 112. The upper surface of the cover layer 120 comprises also at least one retaining means 122 configured for retaining in a removable manner the electronic device 200 in electrical contact with the first electrical connector 112 through the first opening 121. The at least one retaining means 122 may be a mechanical retaining means, a magnetic retaining means, and/or an adhesive, preferably a mechanical retaining means. The at least one retaining means 122 may be separately provided from the cover layer 120 or may be integrally molded with the cover layer.

In the embodiment of FIGS. 1A-1B, the at least one retaining means 122 and the cover layer 120 are molded in one piece, and the at least one retaining means 122 comprises a pair of snap-fit members protruding outwardly on either side of the first opening 121. The cover layer 120 and the at least one retaining means 122 may be made in a material with some elasticity, e.g. plastic, in order for the at least one retaining means 122 to retain the electronic device 200 in a removable manner, preferably in a tool-less manner. The packaging 210 of the electronic device of FIGS. 1A-1B is provided with corresponding indents 211 such that, when the electronic device 200 is pushed in between the pair of snap-fit members, the snap-fit members will, in a first phase, spread open before getting closer and fit within the corresponding indents 211 to retain the packaged electronic device 200. In this manner, the electrical connection of the first electrical connector 112 and the first complementary electrical connector 212 may be maintained securely.

In a favored embodiment, a cable organizer, e.g. a clip (not shown) may be provided to the cover layer 120. The cable organizer may be mounted to the cover layer 120, e.g. using snap-fit member as disclosed above, or may be integral with, i.e. molded in one piece with the cover layer 120. The cable organizer may be configured for retaining one or more cables or wires, e.g. extending to and from the electronic device, such that said one or more cables or wires are better organized. Additionally or alternatively, the cover layer 120 may be provided with embossing or engravings for indicating information to a user of the luminaire head, such as caution messages, component indications, mounting information, etc. Also, the cover layer 120 may be provided with recesses facilitating the placing of components on the cover layer 120. Further, the cover layer may be provided with an integral identification means, such as a unique code, e.g. a QR code.

To help the connection of the electronic device 200 and the first electrical connector 112, a guiding means 123 may be provided. The guiding means 123 may surround the first opening 121. In the embodiment of FIGS. 1A-1B, the guiding means 123 comprises a wall extending outwardly from the upper surface of the cover layer 120 and defines a plug. The packaging 210 of the electronic device may comprise a corresponding recess as a complementary guiding means defining a socket. In another embodiment, the guiding means 123 may comprise a rail element configured for cooperating with an external surface of the electronic device 200 such that a user may connect the electronic device 200 by simply sliding the electronic device 200 into place guided by the rail element. Additionally or alternatively, the guiding means 200 may double as a retaining means by using friction to retain the electronic device 200 electrically connected. In still another exemplary embodiment, the guiding means 200 and the at least one retaining means 122 may be molded in one piece to further optimize the different portions of the interconnecting interface 100.

Supplementary electrical connectors 112, 113, electronic devices 200, and corresponding openings 121 in the cover layer 120 may be added to the interconnected interface 100 to form a more complex electrical circuit interconnecting various electrical components of the luminaire head. For example, a light source connected to the interconnecting interface 100 may be comprised in the luminaire head.

Figure 2A:
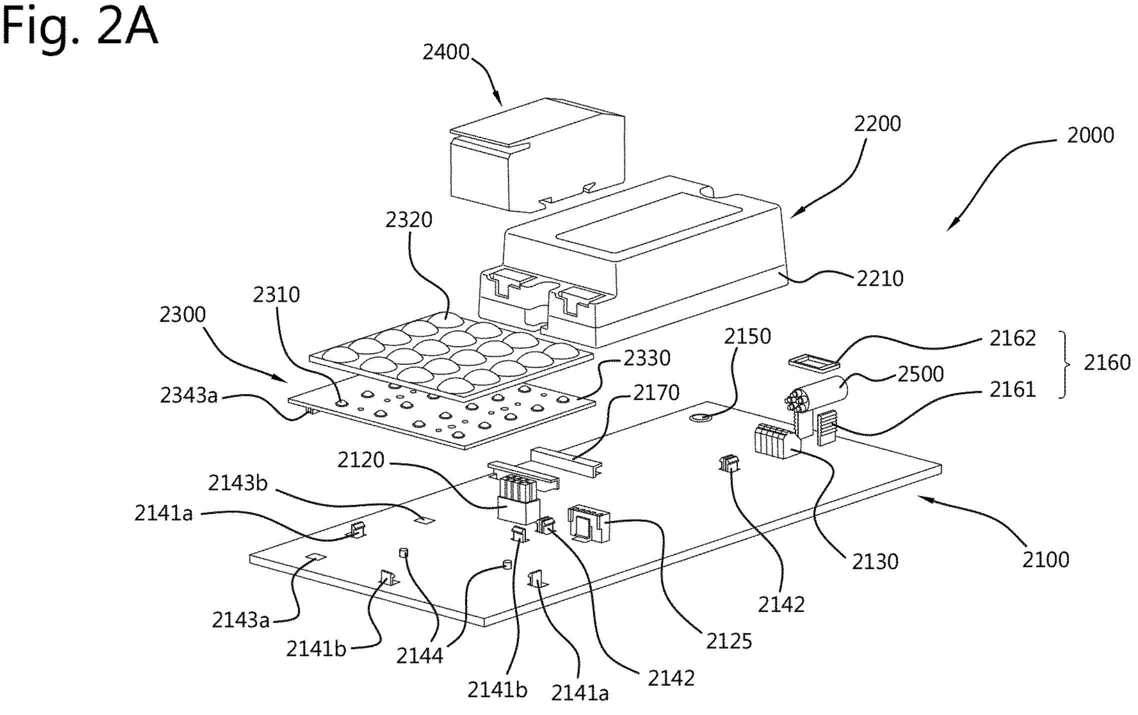
FIGS. 2A and 2B schematically illustrate a partially transparent top perspective view and a bottom perspective view, respectively, of a luminaire head comprising an interconnecting interface according to another exemplary embodiment of the invention.
Figure 2B:
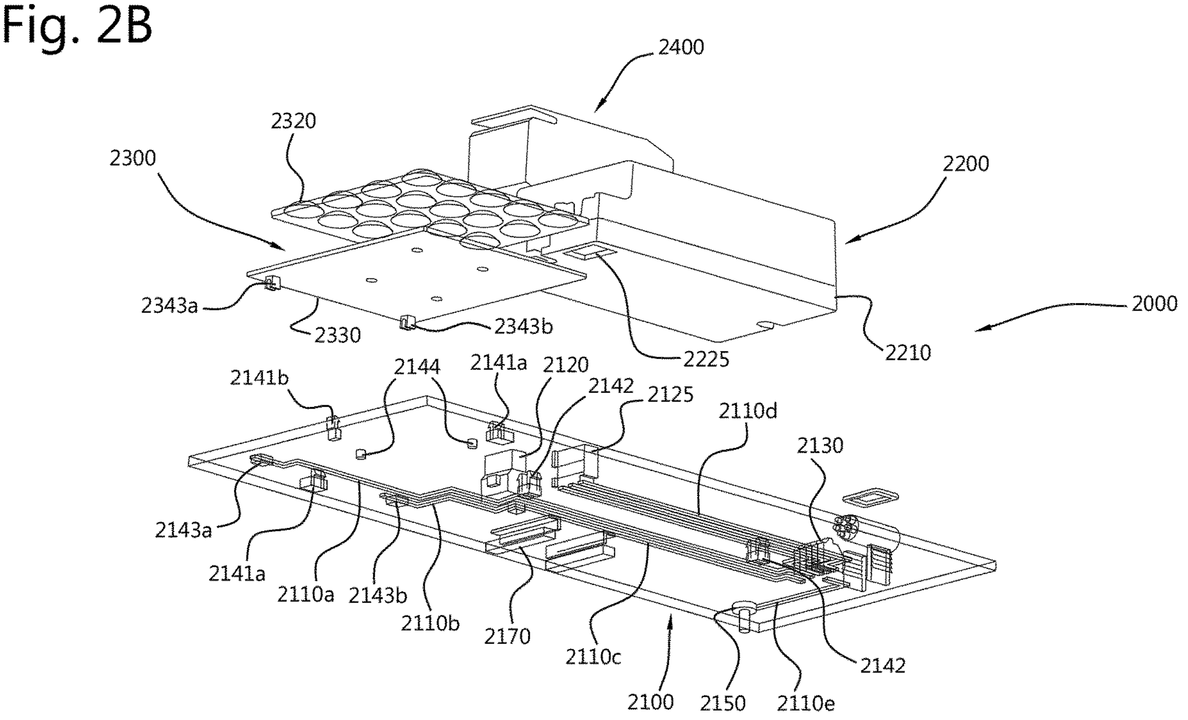

FIGS. 2A and 2B schematically illustrate a partially transparent top perspective view and a bottom perspective view, respectively, of a luminaire head comprising an interconnecting interface according to another exemplary embodiment of the present invention. The luminaire head

2000 comprises an interconnecting interface 2100 for multiple electronic devices 2200, 2300, 2400. The interconnecting interface 2100 comprises a support layer and a cover layer.

In the embodiment of FIGS. 2A-2B, the cover layer and the support layer of the interconnecting interface 2100 may be integrally formed and integrated in a portion of an external wall of the luminaire head housing. The interconnecting interface 2100 may comprise a plurality of electrical tracks 2110*a*, 2110*b*, 2110*c*, 2110*d*, 2110*e* which are submerged within the support layer and the cover layer, for example by multi-shot injection molding. The plurality of electrical tracks 2110*a*, 2110*b*, 2110*c*, 2110*d*, 2110*e* may be arranged in a plane, said plane virtually defining the cover layer on one side facing the multiple electronic devices 2200, 2300, 2400, and defining the support layer on the other side of the plane opposite the cover layer. Depending on embodiments, the support layer is at least 10 cm×10 cm, preferably at least 15 cm×15 cm, more preferably at least 15 cm×30 cm.

The plurality of electric tracks 2110*a*, 2110*b*, 2110*c*, 2110*d*, 2110*e* may be made in an electrically conductive material, e.g. in metal, and the portion of the external wall may be made in an electrically insulating material, e.g. in plastic. The portion of the external wall comprising the interconnecting interface 2100 may be integrally formed with the rest of the luminaire head housing external wall or separately formed.

The interconnecting interface 2100 may comprise a first electrical connector 2120, a second electrical connector 2125, a third electrical connector 2130, a fourth electrical connector 2143*a*, 2143*b*, and a fifth electrical connector 2150. One or more electrical connectors of the plurality of electrical connectors 2120, 2125, 2130, 2143*a*, 2143*b*, 2150 may be similar. The plurality of electrical connectors 2120, 2125, 2130, 2143*a*, 2143*b*, 2150 may be interconnected via the plurality of electrical tracks 2110*a*, 2110*b*, 2110*c*, 2110*d*, 2110*e*. In the embodiment of FIGS. 2A-2B, the fourth electrical connector 2143*a*, 2143*b* is linked to the first electrical connector 2120 via two different electrical tracks 2110*a*, 2110*b*. Each of the two different tracks 2110*a*, 2110*b* may be connected separately via two separate connecting elements 2143*a*, 2143*b* on the side of the fourth electrical connector. Two electrical tracks 2110*c* link the first electrical connector 2120 to the third electrical connector 2130. And three electrical tracks 2110*d* link the third electrical connector 2130 to the second electrical connector 2125. The electrical track 2110*e* may be linked to the fifth electrical connector 2150 connected to the ground. More details on the fifth electrical connector 2150 can be found with respect to FIG. 5A. In another embodiment, the plurality of electrical tracks 2110*a*, 2110*b*, 2110*c*, 2110*d*, 2110*e* may be grounded via another means, e.g. via a soldered wire connected to the ground. Thus, different electrical components of the luminaire head may be interconnected via the interconnecting interface 2100. The skilled person will understand that the plurality of electrical tracks and the plurality of electrical connectors may be arranged in a different manner in order to interconnect the different electrical components for constructing the desired electrical circuit.

At least one among the plurality of electrical connectors 2120, 2125, 2130, 2143*a*, 2143*b* may be suited for connecting to an electronic device 2200, 2300, 2400. In the embodiment of FIGS. 2A-2B, the electronic device 2200 may be a driver enclosed in a casing 2210 configured for being connected to the first and second electrical connectors 2120, 2125 via a first complementary and a second complementary electrical connectors 2225 (only the second is visible). Details on the connection between the second electrical connector 2125 and the second complementary electrical connector 2225 may be found with reference to FIG. 3.

The electrical connectors may be male or female. For example, the first electrical connector 2120 of FIGS. 2A-2B may comprise a plurality of connecting elements, two rows of four female connecting elements, and the second electrical connector 2125 may comprise another plurality of connecting elements, one row of four female connecting elements. The fourth electrical connector 2143*a*, 2143*b* may be configured for being connected to a light module 2300.

In the embodiment of FIGS. 2A-2B, the third electrical connector 2130 may comprise tool-reliant or tool-less connecting elements, and may be configured to be connected to a power supply, such as the mains. The third electrical connector 2130 may be connected to the power supply via an electrical cable 2500. The cover layer of the interconnecting interface 2100 may comprise a cable retaining means 2160 configured for retaining an electrical cable. In the embodiments of FIGS. 2A-2B, the cable retaining means 2160 is configured for retaining the electrical cable 2500 of the power supply such that it faces the third electrical connector 2130. The cable retaining means 2160 may comprise an electrical cable seat 2161, and a cable retainer 2162. More details on the cable retaining means 2160 can be found with respect to FIG. 5B.

The electronic device 2200 and/or the light module 2300 may be retained in a removable manner in electrical contact with the corresponding electrical connectors 2120, 2125, 2143*a*, 2143*b* via at least one retaining means, a plurality of retaining means 2141*a*, 2141*b*, 2142 in FIGS. 2A-2B. The at least one retaining means 2141*a*, 2141*b*, 2142 may include a mechanical retaining means, a magnetic retaining means, and/or an adhesive.

The first and second electrical connectors 2120, 2125 may be provided each with a guiding means to help the connection of the corresponding first and second electrical connectors 2225 of the electronic device 2200.

The light module 2300 of FIGS. 2A-2B may comprise a support plate 2330, e.g. a PCB, with a plurality of light sources 2310, e.g. a plurality of LEDs, arranged thereon. The plurality of LEDs 2310 may be provided with a corresponding plurality of optical elements 2320 placed over them. The plurality of optical elements 2320 may be integrally formed in a plate, for example a lens plate. The plurality of optical elements 2320 may be fixed to the support plate 2330 and guided into place via guiding pins 2144 of the interconnecting interface 2100. The support plate 2330 may be fixed independently from the plurality of optical elements 2320 to the interconnecting interface 2100.

The light module 2300 of FIGS. 2A-2B may be retained by a plurality of snap-fit retaining means 2141*a*, 2141*b*, with four snap-fit members located on each side of the light module 2300 in the embodiment of FIGS. 2A-2B, and guided and oriented into place by the guiding pins 2144 going through the light module 2300. More in particular, in the embodiment of FIGS. 2A-2B, two opposing members 2141*a* of the four snap-fit members of the snap-fit retaining means are configured for retaining the support plate 2330 of the light module, and the other two opposing members 2141*b* of the four snap-fit members of the snap-fit retaining means are configured for retaining the plurality of optical elements 2320. The skilled person will understand that the number of snap-fit retaining means may be adapted to characteristics of the electronic device or component to be retained. The casing 2210 enclosing the electronic device

2200 is retained via a snap-fit retaining means 2142 with two snap-fit members located on either side of the casing 2210. The plurality of retaining means 2141*a*, 2141*b*, 2142 may be integrally formed with the portion of the luminaire head external wall.

In another non-illustrated embodiment, the light module 2300 and the plurality of optical elements 2320 may be provided on the support layer, i.e. on a lower surface of the interconnecting interface 2100. Instead of arranging the LEDs 2310 on a support plate 2330 it is also possible to arrange the LEDs directly on the cover layer or on the support layer, and to omit the support plate 2330.

The fourth electrical connector 2143*a*, 2143*b* comprises in FIGS. 2A-2B two separate connecting elements. The two separate connecting elements consist each in a recess exposing at least one of the plurality of electrical tracks 2110*a*, 2110*b*. Facing the fourth electrical connector 2143*a*, 2143*b*, the support plate 2330 of the light module comprises on its lower surface connecting protrusions 2343*a*, 2343*b* configured to lodge in the corresponding recesses and to electrically connect the plurality of LEDs 2310 arranged on the support plate 2330 to at least one of the plurality of electrical tracks 2110*a*, 2110*b*. Hence, the electronic device, e.g. a driver, a sensing means, a surge protection device, connected to the third electrical connector 2130, and the light module 2300, may be easily interconnected and assembled to the interconnecting interface 2100 comprised in the luminaire head to perform one of the main functions of a luminaire, lighting.

In the embodiments of FIGS. 2A-2B, the electronic device 2400 may include a fuse holder holding at least one fuse. The fuse holder may be retained in a removable manner to the cover layer of the interconnecting interface 2100 via a pair of DIN rails 2170. The pair of DIN rails 2170 may be integrated to the cover layer of the interconnecting interface 2100.

According to another aspect of the invention there is provided a luminaire system including: the power supply, and the luminaire head comprising the interconnecting interface 2100. The luminaire head of the luminaire system may be the luminaire head of any of the hereinabove described luminaire head embodiments. The power supply may be connected to the plurality of electrical tracks 2110*a*, 2110*b*, 2110*c*, 2110*d*, 2110*e* included in the interconnecting interface 2100 of the luminaire head. The skilled person will understand that the plurality of electrical tracks 2110*a*, 2110*b*, 2110*c*, 2110*d*, 2110*e* and the power supply may be electrically connected via any known means, e.g. soldering to electrical pads, via a dedicated electronic connector, etc.

Figure 3:
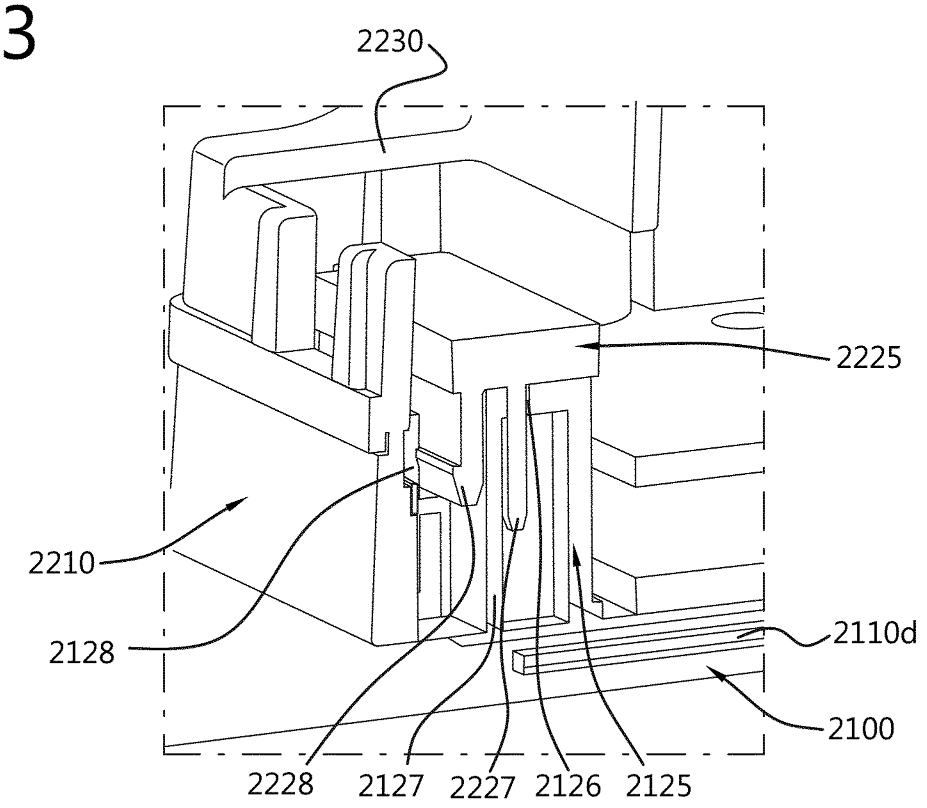
FIG. 3 schematically illustrates a close-up perspective view of an electrical connector connected to an electronic device according to an exemplary embodiment of the invention.

FIG. 3 schematically illustrates a close-up perspective view of an electrical connector connected to an electronic device according to an exemplary embodiment of the present invention.

With reference to FIGS. 2A-2B, the electronic device 2200 may be a driver enclosed in a casing 2210 configured for being connected to the first and second electrical connectors 2120, 2125 via a first complementary and a second complementary electrical connectors 2220, 2225. In the embodiment of FIG. 3, the second electrical connector 2125 is connected to the second complementary electrical connector 2225.

The second electrical connector 2125 is connected to at least one of the plurality of electrical tracks 2110*d* submerged in the interconnecting interface 2100. To reach electrical contact, the second electrical connector 2125, which is a female-type connector, and the second complementary electrical connector 2225, which is a male-type connector, may be plugged together.

In the embodiment of FIG. 3, the second complementary electrical connector 2225 comprises a plurality of contacting pins 2227 extending downwards towards the connecting interface and configured to be plugged in corresponding recesses 2126 of the second electrical connector 2125. The plurality of corresponding recesses 2126 of the second electrical connector acts as a guiding means for the connection. The plurality of corresponding recesses 2126 are formed in an upper surface of a guiding protrusion 2127 extending away from the interconnecting interface.

The guiding protrusion 2127 is provided with a mechanical retaining means 2128, more particularly a snap-fit retaining means. The mechanical retaining means 2128 comprises a wall extending at a distance from the guiding protrusion 2127 and substantially in parallel to it. The mechanical retaining means 2128 of the guiding protrusion presents a lip on its upper end extending towards the guiding protrusion 2127. The second complementary electrical connector 2226 comprises a corresponding mechanical retaining means 2228 comprising a wall extending at a distance from the plurality of contacting pins 2227 and substantially in parallel to them. The corresponding mechanical retaining means 2228 of the connecting pins 2227 presents a lip on its lower end extending away from the connecting pins 2227.

When plugging the second electrical connector 2125 and the second complementary electrical connector 2225, the mechanical retaining means 2128 of the guiding protrusion is spread away from the guiding protrusion 2127. The corresponding mechanical retaining means 2228 of the connecting pins, when plugged, has its lip retained by the lip of the mechanical retaining means 2128 of the guiding protrusion, effectively maintaining the electrical contact of the connecting pins 2227 with at least one of the plurality of electrical tracks 2110*d* via the recesses 2126 of the guiding protrusion 2127. The electronic device is thus mounted to the cover layer.

Optionally, the connecting pins 2227 may provided with upper connecting elements accessible from the top of the casing 2210 to allow connecting an additional module to the driver, for example, via a slot 2230 in the casing 2210 of the driver.

Figure 4A:
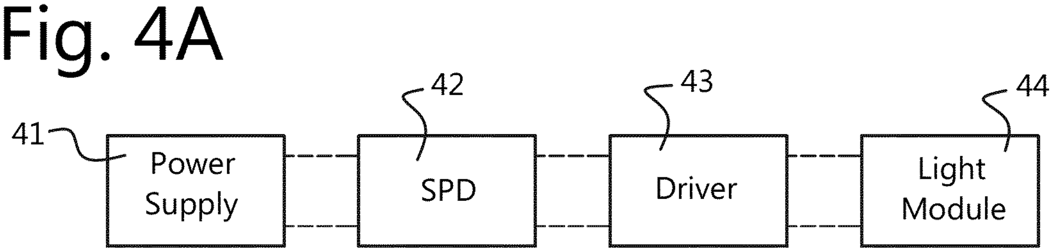
FIGS. 4A and 4B schematically illustrate a typical luminaire head and a luminaire head according to another exemplary embodiment of the invention, respectively.
Figure 4B:
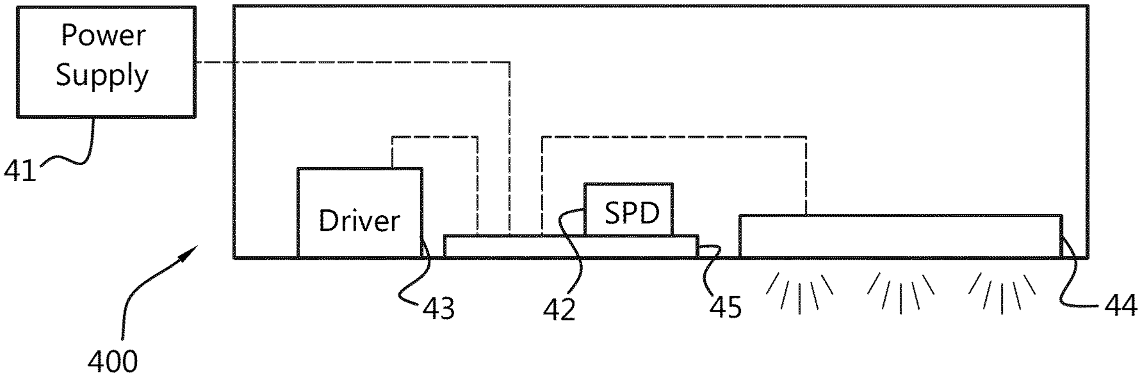

FIGS. 4A-4B schematically illustrate a typical luminaire head and a luminaire head according to another exemplary embodiment of the present invention, respectively.

A luminaire head generally comprise a light module 44 with support, typically a PCB, and at least one light source arranged thereon, a driver 43 configured for driving the at least one light source, a surge protection device (SPD) 42 between a power supply 41 and the driver 43. Typically, the at least one light source of the light module 44 comprise a plurality of LEDs connected in series and/or in parallel.

The driver 43 for the at least one light source of the light module 44, typically in the form of a LED driver, may be arranged in or on a luminaire head 400, in or on the luminaire pole, or in any other suitable location of a luminaire system. The SPD 42 is provided in order to leverage the benefit of long life of the at least one light source of the light module 44, typically a plurality of LEDs. The SPD 42 protects the driver 43 against surge events. The driver 43 may be configured to convert an AC voltage in a DC drive current for the at least one light source of the light module 44.

In FIG. 4A, the SPD 42 is connected in series. When connected in series, a first and second power terminal are connected to a first and a second power supply line leading to the power supply 41, and a third and fourth power terminal are connected to a third and a fourth power supply line leading to the driver 43. In another embodiment, the SPD 42 may be connected in parallel.

As illustrated in FIG. 4B, an interconnecting interface 45 comprised in a luminaire head 400 may comprise at least four electrical connectors, said plurality of electrical connector each being connected to at least one of a plurality of electrical tracks. In the embodiment of FIG. 4B, the first electrical connector is connected to the power supply 41, the second electrical connector is connected to the driver 43, the third electrical connector is connected to the light module 44, and the fourth electrical connector is connected to the surge protection device 42. The plurality of electrical tracks may interconnect at least two electrical components among the SPD 42, the driver 43, and the light module 44. The SPD 42 may be enclosed in a housing and the housing of the SPD 42 may be supported and/or maintained on a cover layer of the interconnecting interface 45. In another embodiment, the driver 43 may be enclosed in a housing and the housing of the driver 43 may be supported and/or maintained on the cover layer of the interconnecting interface 45. In yet another embodiment, the light module 44 may be supported and/or maintained on the cover layer of the interconnecting interface 45. In still another embodiment, the interconnecting interface 45 may be part of an external wall of the luminaire head 400 housing, and the SPD 42, the driver 43, and the light module 44 may be all supported and/or maintained on the said part of the external wall.

Figure 5A:
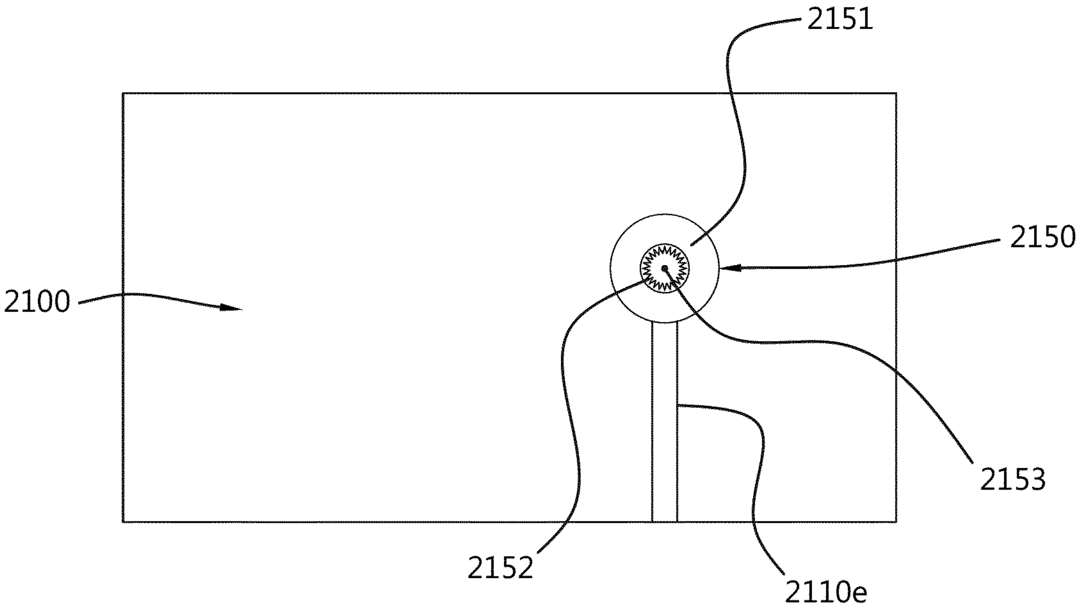
FIGS. 5A and 5B schematically illustrate close-up views of portions of an interconnecting interface according to an exemplary embodiment of the invention.
Figure 5B:
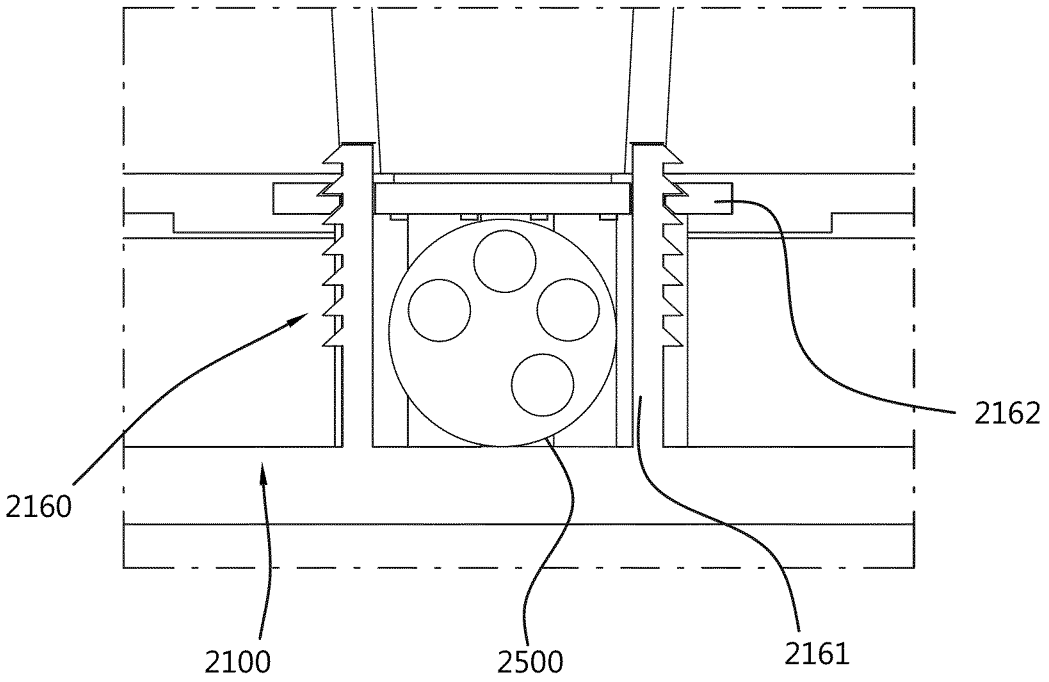

FIGS. 5A and 5B schematically illustrate close-up views of portions of an interconnecting interface according to an exemplary embodiment of the present invention.

FIG. 5A illustrates a partially transparent top view of the fifth electrical connector 2150 referred to with respect to FIGS. 2A-2B. The fifth electrical connector 2150 may be connected to the rest of the electrical circuit via the electrical track 2110*e* submerged in the interconnecting interface 2100. The electrical track 2110*e* may be connected to a conductive exposed annular portion 2151 of the fifth electrical connector 2150. The conductive exposed annular portion 2151 may be configured for being in electrical contact with a metallic portion of the luminaire head housing. The conductive exposed annular portion 2151 may include a plurality of serrated teeth 2152 extending downwardly and towards the center of the conductive exposed annular portion 2151. The plurality of serrated teeth 2152 may be configured for improving the electrical contact between the portion of the luminaire head housing and the fifth electrical connector 2150. The conductive exposed annular portion 2151 may be provided with a central passage 2153. The central passage 2153 may be configured for enabling a bolt to pass through such that the interconnecting interface 2100 can be attached to the portion of the luminaire head housing. By establishing the electrical contact between the interconnecting interface 2100 and the luminaire head housing, and by attaching them one to another, the electrical circuit connected to the fifth electrical connector 2150 via the electrical track 2110*e* may be provided with a ground.

FIG. 5B illustrate a cut side-view of the cable retaining means 2160 referred to with respect to FIGS. 2A-2B. The cable retaining means 2160 may be configured for retaining an electrical cable 2500, e.g. the electrical cable of the power supply, such that it faces a corresponding electrical connector. In this manner, precision and reliability of the electrical contact at the level of the electrical connector may be improved. The cable retaining means 2160 may comprise the electrical cable seat 2161 and the cable retainer 2162. The electrical cable seat 2161 may be integrated to the outer surface of the cover layer of the interconnecting interface 2100. In the embodiment of FIG. 5A, the electrical cable seat 2161 includes a pair of parallel tabs extending away from the outer surface of the cover layer of the interconnecting interface 2100. Each of the pair of parallel tabs may be provided on its outer surface with a saw-tooth profile. The cable retainer 2162 may be provided with a central opening. The central opening of the cable retainer 2162 may be configured for being engaged with the pair of parallel tabs of the electrical cable seat 2161 and for cooperating with the saw-tooth profile. When cooperating with the electrical cable seat 2161, the cable retainer 2162 may restrain the electrical cable 2500 from leaving the electrical cable seat 2161 within each it is provided. Due to the saw-tooth profile of the electrical cable seat 2161, the cable retainer 2162 may be prevented from being removed from the electrical cable seat 2161, thereby insuring the fixed position of the electrical cable 2500.

FIGS. 6A-6D schematically illustrate cut side-views of various electrical connectors suitable for an interconnecting interface according to an exemplary embodiment of the invention.

In the embodiments of FIGS. 6A-6D, an interconnecting interface 6100 of a luminaire head may comprise a plurality of electrical tracks 6111. The plurality of electrical tracks 6111 may be submerged within the interconnecting interface 6100. The plurality of electrical tracks 6111 may be connected in electrical contact with an electronic device (not shown) thanks to an electrical connector linked to at least one of the plurality of electrical tracks 6111 connecting to a corresponding connecting element linked to the electronic device.

Figure 6A:
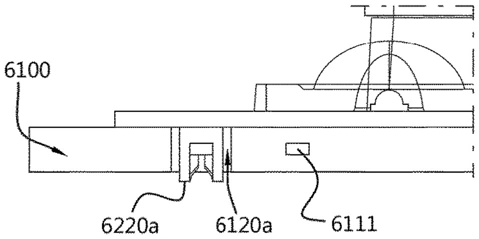
FIGS. 6A-6D schematically illustrate various electrical connectors suitable for an interconnecting interface according to an exemplary embodiment of the invention.

In the embodiment of FIG. 6A, the electrical connector connected to the at least one of the plurality of electrical tracks 6111 includes a connecting recess 6120*a* and an exposed portion of electrical track included within the connecting recess 6120*a*. The corresponding connecting element connected to the electronic device may be a knife connector 6220*a* made in a conductive material. The knife connector 6220*a* may be configured for cutting into the section of the exposed portion of electrical track within the connecting recess 6120*a* when pushed against it, thereby establishing electrical connection between the plurality of electrical tracks 6111 and the electronic device.

Figure 6B:
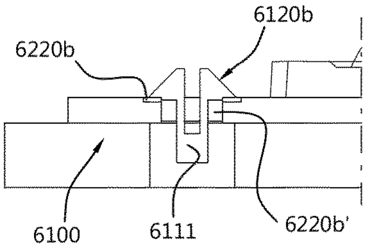

In the embodiment of FIG. 6B, the electrical connector connected to the at least one of the plurality of electrical tracks 6111 includes a connecting spring 6120*b* extending away from a cover layer of the interconnecting interface 6100. The connecting spring 6120*b* may comprise a pair of tabs. The pair of tabs of the connecting spring 6120*b* may be integrally formed with the at least one of the plurality of electrical tracks 6111. The corresponding connecting element connected to the electronic device may include an external terminal 6220*b* surrounding a connecting passage 6220*b*', said connecting passage 6220*b*' going through a support of the electronic device. The external terminal 6220*b* may be made of a conductive material. The connecting spring 6120*b* and the external terminal 6220*b* may cooperate and be electrically connected by snap-fitting the connecting spring 6120*b* through the connecting passage 6220*b*'.

Figure 6C:
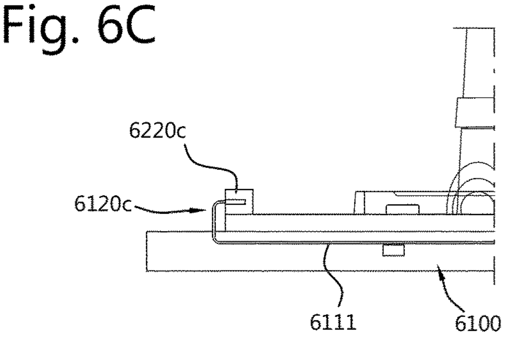

In the embodiment of FIG. 6C, the electrical connector connected to the at least one of the plurality of electrical tracks 6111 includes an outwardly protruding connecting pin 6120*c*. The outwardly protruding connecting pin 6120*c* may follow a C-profile in order to allow a sideway electrical connection. The corresponding connecting element connected to the electronic device may comprise a push-in connector 6220*c*. The push-in connector 6220*c* may be located on a side of a support of the electronic device. When mounting the electronic device into place, the outwardly protruding connecting pin 6120*c* may be slid from the side of the electronic device within the push-in connector 6220*c*, thereby establishing electrical connection between the plurality of electrical tracks 6111 and the electronic device.

Figure 6D:
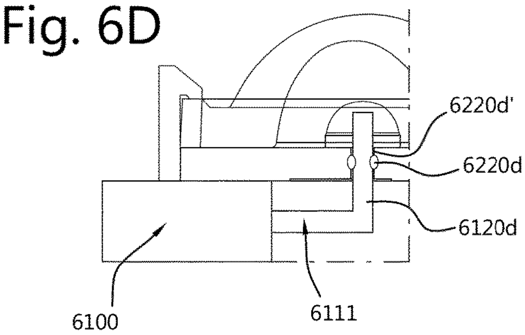

In the embodiment of FIG. 6D, the electrical connector connected to the at least one of the plurality of electrical 6111 includes an outwardly protruding connecting pin 6120*d*. The corresponding connecting element connected to the electronic device may include a connecting passage 6220*d*', said connecting passage 6220*d*' going through a support of the electronic device. The connecting passage 6220*b*' may be internally coated with a conductive material. Electrical connection between the connecting passage 6220*d*' and the outwardly protruding connecting pin 6120*d* may be achieved thanks to a laser welding 6220*b*.

Figure 7:
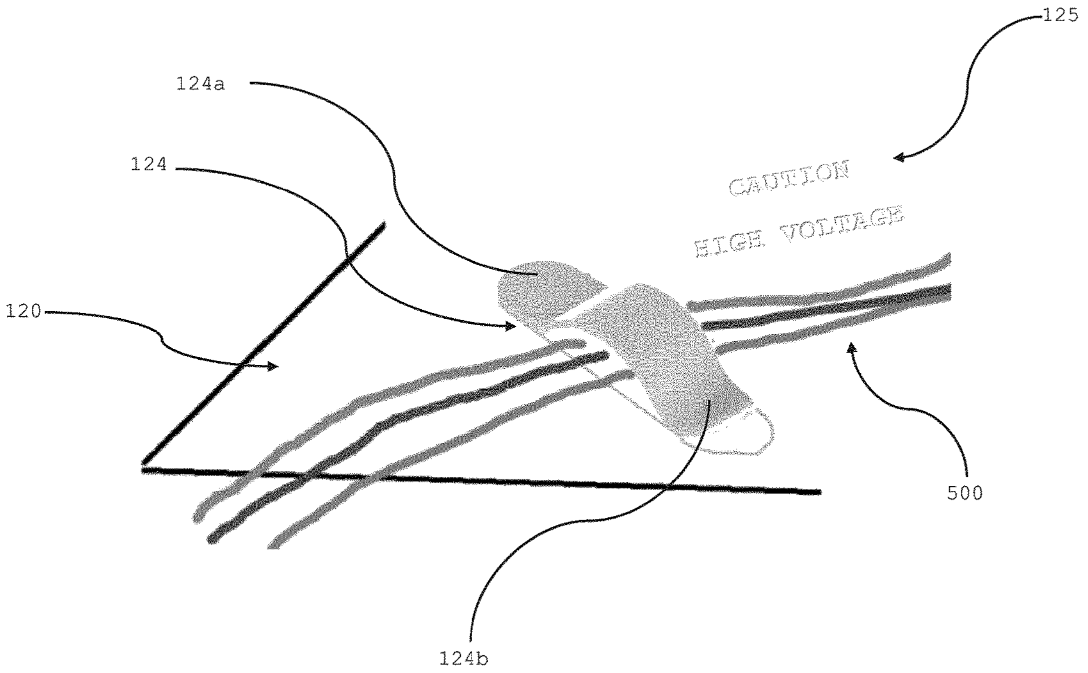
FIG. 7 schematically illustrates a portion of a luminaire head with a cable organizer according to an exemplary embodiment of the invention.

FIG. 7 schematically illustrates a portion of a luminaire head with a cable organizer according to an exemplary embodiment of the present invention. It may be the luminaire head illustrated in FIGS. 1A-1B or FIGS. 2A-2B. The cable organizer 124, such as a clip may be provided to the cover layer 120. The cable organizer 124 may be mounted to the cover layer 120 or may be integral to the cover layer 120, integral to the cover layer in FIG. 7 and molded in one piece with the cover layer 120. The cable organizer 124 may be configured for retaining and/or guiding and/or positioning one or more cables or wires 500 extending e.g. to and from the electronic device, such that said one or more cable or wires 500 are better organized. For example, the cable organizer 124 may be a simple bracket dimensioned and shaped such that one or more cables or wires 500 can be arranged below the bracket. In the embodiment, the cable organizer 124 comprises a fixed end 124*a* fixed to the cover layer 120 and a free end 124*b* such that the one or more cables or wires 500 can be arranged under a middle portion of the cable organizer 124 from the free end 124*b* side.

Additionally or alternatively, the cover layer 120 may be provided with embossing or engravings for indicating information 125 to a user of the luminaire head, such has caution messages, component indications, mounting information, etc. Also, the cover layer 120 may be provided with recesses (not shown) facilitating the placing of components on the cover layer 120.

Whilst the principles of the invention have been set out above in connection with specific embodiments, it is to be understood that this description is merely made by way of example and not as a limitation of the scope of protection which is determined by the appended claims.

The invention claimed is:

1. Luminaire head comprising an interconnecting interface for an electronic device, said interconnecting interface comprising:

a support layer comprising:

a plurality of electrical tracks arranged on a surface of the support layer and connectable to a power supply of the luminaire head;

a first electrical connector, said first electrical connector being connected to at least one of the plurality of electrical tracks and being suited for connecting to the electronic device; and a second electrical connector, said second electrical connector being directly connected to the first electrical connector via the at least one of the plurality of electrical tracks; and a cover layer arranged over the support layer, wherein an upper surface of the cover layer comprises a first opening forming passage for the first electrical connector and at least one retaining means configured for retaining in a removable manner the electronic device in electrical contact with the first electrical connector through the first opening.

2. The luminaire head according to claim 1, further comprising a luminaire head housing, wherein the support layer is arranged on the luminaire head housing, and preferably, wherein the electronic device, when connected to the first electrical connector and when the support layer is placed within the luminaire head housing, is removable from within the luminaire head housing.

3. The luminaire head according to claim 2, wherein the support layer and a portion of the luminaire head housing are molded in one piece, and preferably, wherein the portion of the luminaire head housing is an external wall of the luminaire head housing.

4. The luminaire head according to claim 1, wherein the at least one retaining means and the cover layer are molded in one piece.

5. The luminaire head according to claim 1, wherein the at least one retaining means is a mechanical retaining means, preferably a snap-fit retaining means.

6. The luminaire head according to claim 1, wherein the support layer and the cover layer are molded in one piece.

7. The luminaire head according to claim 1, wherein the support layer is at least 10 cm×10 cm, preferably at least 15 cm×15 cm, more preferably at least 15 cm×30 cm.

8. The luminaire head according to claim 1, wherein the electronic device is one of: a driver, a sensing means, a processing means, a transmission means, a communication means, a metering device, an electrical protection means, a filtering unit, a surge protection device, a fuse, a varistor, a control module, or other active or passive electronic components.

9. The luminaire head according to claim 1, further comprising the electronic device provided to the interconnecting interface and supported by the cover layer or the support layer, and, preferably, wherein the electronic device is embedded in a packaging.

10. The luminaire head according to claim 1, wherein the cover layer is in contact with the plurality of electrical tracks, or wherein the cover layer is at a distance of less than 5 mm, preferably less than 3 mm, more preferably less than 1 mm from the plurality of electrical tracks.

11. The luminaire head according to claim 1, wherein the upper surface of the cover layer comprises a guiding means surrounding the first opening and configured for guiding the connection of the electronic device with the first electrical connector through the first opening, and, preferably, wherein the guiding means is configured for engaging the packaging of the electronic device.

12. The luminaire head according to claim 6, wherein the plurality of electrical tracks is submerged in one piece consisting of the cover layer and the support layer.

13. The luminaire head according to claim 1, wherein the upper surface of the cover layer comprises a second opening forming passage for the second electrical connector.

14. The luminaire head according to claim 1, further comprising a light module electrically connected to the interconnecting interface, and preferably, wherein the light module comprises a LED array provided to the support layer or the cover layer.

15. The luminaire head according to claim 1, wherein the second electrical connector is suited for connecting to another electronic device.

16. The luminaire head according to claim 1, wherein the support layer further comprises a third electrical connector, said third electrical connector being connected to at least one of the plurality of electrical tracks, and preferably further comprises a fourth electrical connector, said fourth electrical connector being connected to at least one of the plurality of electrical tracks, and more preferably further comprises a fifth electrical connector, said fifth electrical connector being connected to at least one of the plurality of electrical tracks.

17. The luminaire head according to claim 16, wherein the first electrical connector is connected to a driver, and, optionally, wherein the second electrical connector is connected to a light module, wherein the third electrical connector is connected to a sensing means, wherein the fourth electrical connector is connected to a surge protection device, and wherein the fifth electrical connector is connected to a controller socket.

18. The luminaire head according to claim 1, wherein one or more structural elements, such as a cable organizer, are molded in one piece with the cover layer.

19. Luminaire head comprising an interconnecting interface for an electronic device, said interconnecting interface comprising:

a support layer comprising:
- a plurality of electrical tracks arranged on a surface of the support layer and connectable to a power supply of the luminaire head;
- a first electrical connector, said first electrical connector being connected to at least one of the plurality of electrical tracks and being suited for connecting to the electronic device; and
- a second electrical connector, said second electrical connector being directly connected to the first electrical connector via the at least one of the plurality of electrical tracks;

a cover layer arranged over the support layer; and a luminaire head housing, wherein the support layer is arranged on the luminaire head housing, wherein the support layer and a portion of the luminaire head housing are molded in one piece, and wherein an upper surface of the cover layer comprises a first opening forming passage for the first electrical connector.

20. Luminaire head comprising an interconnecting interface for an electronic device, said interconnecting interface comprising:

a support layer comprising:
- a plurality of electrical tracks arranged on a surface of the support layer and connectable to a power supply of the luminaire head;
- a first electrical connector, said first electrical connector being connected to at least one of the plurality of electrical tracks and being suited for connecting to the electronic device; and
- a second electrical connector, said second electrical connector being directly connected to the first electrical connector via the at least one of the plurality of electrical tracks; and a cover layer arranged over the support layer, wherein an upper surface of the cover layer comprises a first opening forming passage for the first electrical connector, and wherein the cover layer is in contact with the plurality of electrical tracks or the cover layer is at a distance of less than 5 mm, preferably less than 3 mm, more preferably less than 1 mm from the plurality of electrical tracks.

* * * * *